United States Patent [19]
Chambers

[11] 4,337,485
[45] Jun. 29, 1982

[54] BROADCAST TELETEXT SYSTEM

[75] Inventor: John P. Chambers, Copthorne, England

[73] Assignee: British Broadcasting Corporation, London, England

[21] Appl. No.: 190,470

[22] Filed: Sep. 24, 1980

[30] Foreign Application Priority Data

Oct. 31, 1979 [GB] United Kingdom ............... 7937687

[51] Int. Cl.³ .............................................. H04N 7/00
[52] U.S. Cl. ................................................ 358/147
[58] Field of Search ....................... 358/142, 146, 146

[56] References Cited

U.S. PATENT DOCUMENTS 3,982,065  9/1976  Barnaby et al. ..................... 358/147

Primary Examiner—Robert L. Richardson
Attorney, Agent, or Firm—Robert F. O'Connell

[57] ABSTRACT

Each broadcast page contains a row such as row 29 which is outside the set of displayed rows. In addition to the standard initial bytes CR (clock run in), FC (framing code) and MRAG (magazine number of 3 bits and row number of 5 bits), there are 4 bytes allocated to a 16-bit cyclic rundancy check code CRC for the page and 6 groups, of 6 bytes each, NEXT 0 to NEXT 5. Bytes are Hamming coded and thus contain only 4 message bits. Each 6-byte group is a pointer to another page address made up of page tens and page units (4 bits each), hour code tens and units (2 bits plus 4 bits) and minute code tens and units (3 bits plus 4 bits). The three spare bits from the tens bytes for hours and minutes contain a number which is normally 0 but, if not 0, is added modulo-8 in the decoder to the current magazine number in MRAG to derive the magazine number for the 'next' page. A decoder equipped with a multipage store can respond to the pointers to acquire a sequence of pages automatically, all available immediately to the viewer.

A specific line, not related to any particular page, say magazine 8 row 30, can be transmitted say once a second and includes a 6-byte group addressing a title page. Whenever a receiver is switched on or to a channel carrying teletext, the decoder automatically responds to this line to acquire the addressed title page.

3 Claims, 4 Drawing Figures

FIG.3

| CR | FC | MRAG | CRC | NEXT 0 | NEXT 1 | NEXT 2 | NEXT 3 | NEXT 4 | NEXT 5 |
|---|---|---|---|---|---|---|---|---|---|
| (1,2) | (3) | (4,5) | (6-9) | (10-15) | (16-21) | (22-27) | (28-33) | (34-39) | (40-45) |

← ROW 29

FIG.4

| CR | FC | MRAG | T.V. LABEL | TITLE PAGE ADDRESS | SUPPLEMENTARY INFORMATION |
|---|---|---|---|---|---|
| (1,2) | (3) | (4,5) | (6-9) | (10-15) | (16-45) |

← MAG. 8 ROW 30

BROADCAST TELETEXT SYSTEM

The present invention relates to a broadcast teletext system such as is operated commercially in the United Kingdom in accordance with "Broadcast Teletext Specification", published September 1976 jointly by British Broadcasting Corporation and others. A broadcast teletext system transmits pages of alphanumeric/graphic data for display on the screen of a television receiver equipped with a teletext decoder including a page store. The data is multiplexed on to normal T.V. broadcasts so as not to interfere with T.V. reception, specifically in the U.K. today by transmitting two digitally coded data lines on T.V. lines 17(330) and 18(331) in the field blanking interval. A page consists of 24 rows and requires 12 fields to be transmitted. Therefore about 4 pages per second can be transmitted. Although a page only consists of 24 rows, namely rows 0 to 23, the aforementioned "Broadcast Teletext Specification" allows rows 24 to 31 also to be transmitted, although such rows are not displayed. As will appear below, these non-displayed rows are useful for the purposes of the present invention.

Pages are addressed by magazine and page number, there being 8 magazines available (one decimal address digit), each of 100 pages capacity (two decimal address digits), giving a choice of up to 800 pages. The pages are transmitted in cyclic sequence and the mean access time to a page chosen at random is therefore long, frustratingly long for the ordinary user.

Furthermore the three digits of the magazine and page numbers are supplemented by a four digit sub-code which is actually a time-of-day code (in hours and minutes or the 24-hour clock), enabling large amounts of data to be broadcast on some pages by changing the content as frequently as every minute. The user is thus confronted with 7-digit selection codes for setting into his receiver to choose the page which is to be displayed.

In the teletext system as operated today, the magazine number, page number and sub-code are carried in the page header, which is row 0 of the page and indicates the start of transmission of the rows of a particular page. In the decoder, the numbers in the page header are compared with the numbers selected by the viewer. If the numbers correspond, the subsequent data lines of that magazine are accumulated in the page store of the decoder for display on the television screen. This process is halted by the detection of another page header, which does not correspond to the selected page, of the magazine.

Teletext decoders are now becoming available which can store several pages, while displaying only one page at a time. Any page which is already in store can be selected for immediate display, i.e., without the long access time referred to above. Some means have to be provided for selecting the pages to go into the store and one object of this invention is to provide a teletext system which enables the teletext editor to set up sequences of pages for automatic capture by a suitably equipped decoder. This will enable the viewer to switch easily between selected pages without any access time.

According to the present invention, there is provided, a broadcast teletext system which transmits pages of information, each made up of a plurality of rows, including a row which contains a digitally coded page address, wherein at least some pages are transmitted with an extra row which lies outside the set of displayed rows and which carries one or more codes pointing to another page address.

It will be convenient to call the extra row the "page-service line" and to call a code pointing to another page address a "pointer".

The invention allows the teletext editor to append to each page a pointer indicating which page is the next in the sequence. This pointer is used in the decoder to preselect this page and capture it in storage ready for when it is required. The detection of the pointer on this second page enables the third page in the sequence to be captured, and so on until the available storage is exhausted. The pointers can convey the details of more than one following page, allowing a possible choice of page by the viewer to be anticipated. One pointer could convey details of an initial page of a sequence allowing, for example, the first page of a multi-page story to be selected, and one pointer could give an indication of the final page of a sequence to allow an automatic recording to be terminated.

The invention will allow the use of teletext to be extended to long sequences of pages and multiple choices of pages without the viewer needing to become familiar with and use seven-digit groups (i.e. magazine number, page number and time code) to call up individual pages. It will dramatically improve the apparent access time in multipage decoders. It will allow the automatic storage of sequences of pages.

The invention is also concerned with a means whereby a title page (containing say information about one or more initial pages to which the viewer can move and supplementary information about the television programme, time, data and so on) can be made immediately available to the viewer without constraining the teletext editors or the broadcast engineers in their use of the medium.

This is achieved in that another extra row which lies outside the set of displayed rows and which is not related to any specific page is transmitted periodically and contains coded information identifying at least one page.

The said other extra row may be referred to as the television service line and it can be used to ensure that a teletext decoder is loaded with an initial page or set of pages as soon as it is switched on or a new television channel is selected.

An embodiment of the invention will now be described, by way of example, in the context of the U.K. system of the "Broadcast Teletext Specification". This embodiment is fully compatible in the sense that it will in no way interfere with the operation of existing teletext decoders, which are not equipped to take advantage of the extra lines.

In the drawings:

FIG. 3 shows the format of a page service row; and

FIG. 4 shows the format of a television service row.

Figures 1, 2:
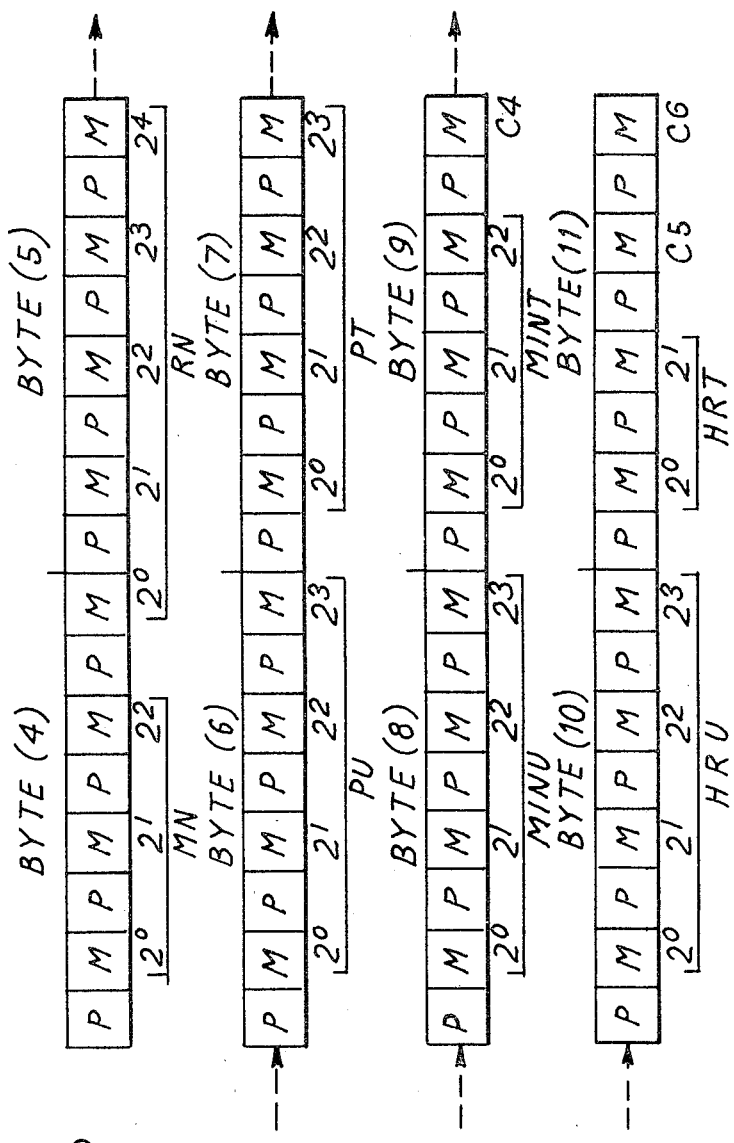
FIG. 1 shows the format of the page header, row 0.
FIG. 2 shows 8 bytes of the page header in more detail.

The information conveyed by FIGS. 1 to 3 is taken from FIG. 6 of the "Broadcast Teletext Specification" but is reproduced here for a clear understanding of the present invention, which is embodied in the extra rows illustrated in FIGS. 3 and 4.

Each row consists of 45 bytes and FIG. 1 shows the first 13 bytes of row 0. The remaining 32 bytes are character bytes, each consisting of 7 message bits plus 1 parity bit, coding characters for display, typically the name of the service, page number, date, clock time. The initial 13 bytes are identified as follows:

| (1,2) | CR | Clock run-in (2 bytes) |
|---|---|---|
| (3) | FC | Framing code |
| (4,5) | MRAG | Magazine and row address group (2 bytes) |
| (6) | PU | Page number, units |
| (7) | PT | Page number, tens |
| (8) | MINU | Time, minutes, units |
| (9) | MINT | Time, minutes, tens |
| (10) | HRU | Time, hours, units |
| (11) | HRT | Time, hours, tens |
| (12) | CA | Control group A |
| (13) | CB | Control group B |

All of bytes (4) to (13) are heavily protected, consisting of four message bits alternating with protection bits derived in accordance with a Hamming code. This enables single bit errors to be corrected as well as detected. Bytes (6) to (13) are unique to row 0. Bytes (12) and (13) are of no interest for the purposes of the present invention; they contain control bits commanding particular control functions in the decoder as explained in "Broadcast Teletext Specification".

FIG. 2 shows the detailed structure of bytes (4) to (11). M and P denote message bits and protection bits respectively. MRAG is broken down into MN, 3 bits, for the magazine number and RN, 5 bits, for the row number enabling rows 0 to 31 to be addressed as already noted. PU, PT, MINU and HRU are all four-bit values. However MINT only requires 3 bits and there is a spare message bit denoted C4. HRT only requires 2 bits and there are spare message bits denoted C5 and C6. These, like the message bits in CA and CB, are control bits with functions assigned in "Broadcast Teletext Specification".

Rows 1 to 23 consist of bytes (1) to (5) exactly as in FIG. 1 followed by 40 character bytes. It should be noted that the page number PU, PT is in the page header row 0 only. This row must be transmitted first but rows 1 to 23, and for that matter rows 1 to 31 can then be transmitted in any order. They are taken to belong to the page denoted by the preceding page header (until a new page header arrives).

Referring now to FIG. 3, an extra data line per page, the 'page-service line', is used to carry the 'pointers' to one or more next pages. This data line carries the row address 29 and the magazine number of the page to which it relates. The page service line is included in the transmission sequence as if it were another data line of the page corresponding to another row of text. It is preferable to transmit the page service line immediately after the page header to maximise the time available for the operations required in the decoder.

In the illustrated line structure, all 40 bytes (6) to (45) are Hamming coded so each byte contains four message bits. The first four bytes contain a 16-bit cyclic redundance check word CRC on the contents of the page. This allows the correctness and completeness of the current page to be tested before the next page is selected. This feature is particularly valuable when a sequence of pages is being written into storage without human intervention. The following 36 bytes comprise six groups of six bytes, each group containing the page number, time code and, indirectly, the magazine number of a 'next' page. The structure of each such block of six bytes follows exactly the pattern of bytes (6) to (11) in FIG. 2 but bits C4, C5 and C6 have a different significance. They are used as a 3-bit modifier for the magazine number. The number represented by the three-bit binary number, with $C_4$ as the least significant bit and $C_6$ as the most significant bit is added, modulo-8, to the magazine number carried by the page service line to give the magazine number of the 'next' page. When these three bits are set to zero the magazine number remains unchanged.

The groups of six bytes refer to six possible 'next' pages, which are referred to as 'NEXT 0', 'NEXT 1' . . . 'NEXT 5' and selected by the viewer using the keypad. 'NEXT 0' refers to the first page of that sequence and 'NEXT 1' the first, or perhaps only, choice of subsequent page. A case including the page number FF (in hexadecimal notation) indicates that there are no other pages in the chosen sequence.

The television service line structure is illustrated in FIG. 4. This data line carries a magazine row and address group (MRAG) formally corresponding to magazine 8, row 30. The decoder is arranged to make use of this line regardless of whether any other teletext pages are selected. In particular, this television service line may be included anywhere in the transmitted sequence of data lines without interfering with the normal operation of decoders, even if they are operating on magazine 8.

The television service line contains 40 bytes of data, following bytes (1) to (5). The first four bytes contain, in Hamming coded form, a 16-bit label for the accompanying television programme. This label is allocated in such a way that there is no possibility of ambiguity between different programmes that can be received in a given area. The label is used in automatic programme selection systems. The next six bytes contain the page number, time code and magazine number of a teletext page chosen to be the 'initial' or title page of the accompanying teletext service. A decoder with acquire this initial page before any other page has been selected by the viewer. The remaining 30 bytes of the television service line can convey information relating to the accompanying television programme, and an indication of the date, day and time, in a form intended for direct display and/or a coded form for automatic control. It is envisaged that the television service line will be repeated at regular intervals of one second and it can supplement or even replace the information currently obtained in the text of teletext page headers, i.e. in bytes (14) to (45) of page headers.

Although the invention has been described in the context of a 625 line 50 field/sec. television system such as is employed in the United Kingdom it will be apparent that the principles of the invention are equally applicable to systems with other standards, e.g. the NTSC 525 line 60 field/sec. system. The data may be transmitted on TV lines other than those mentioned and the invention is not restricted to the 24 row page format described.

I claim:

1. In a method of broadcast teletext transmission wherein information is transmitted as pages, comprising the steps of transmitting, for each page, a plurality of rows of information forming a set of rows intended for display, at least one of said rows containing a digitally coded page address; and further transmitting, for at least some pages, an additional row of information outside said set of rows and not intended for display, said additional row containing one or more codes pointing to another page address.

2. In a method according to claim 1 wherein said pages are grouped in a plurality of N magazines and the one or more codes in said additional row which point to said another page address correspond to a page number which, when added modulo-N to the current magazine number, yields a new magazine number.

3. In a method according to claim 1 or 2 and further comprising the step of
 periodically transmitting a further additional row of information, lying outside said set of rows and not being intended for display, said further additional row not being related to any specific page and containing coded information identifying at least one page.

* * * * *